(12) United States Patent
Wu et al.

(10) Patent No.: US 12,183,941 B2
(45) Date of Patent: Dec. 31, 2024

(54) BATTERY, POWER CONSUMPTION DEVICE, AND METHOD AND DEVICE FOR PRODUCING BATTERY

(71) Applicant: JIANGSU CONTEMPORARY AMPEREX TECHNOLOGY LIMITED, Jiangsu (CN)

(72) Inventors: Kai Wu, Jiangsu (CN); Zhanyu Sun, Jiangsu (CN); Xiaoteng Huang, Jiangsu (CN); Langchao Hu, Jiangsu (CN); Haiqi Yang, Jiangsu (CN); Jiarong Hong, Jiangsu (CN); Wenli Wang, Jiangsu (CN)

(73) Assignee: JIANGSU CONTEMPORARY AMPEREX TECHNOLOGY LIMITED, Jiangsu (CN)

( * ) Notice: Subject to any disclaimer, the term of this patent is extended or adjusted under 35 U.S.C. 154(b) by 1038 days.

(21) Appl. No.: 17/139,766

(22) Filed: Dec. 31, 2020

(65) Prior Publication Data
US 2022/0123424 A1 Apr. 21, 2022

Related U.S. Application Data

(63) Continuation of application No. PCT/CN2020/121995, filed on Oct. 19, 2020.

(51) Int. Cl.
*H01M 50/325* (2021.01)
*H01M 10/0525* (2010.01)
(Continued)

(52) U.S. Cl.
CPC ..... *H01M 50/325* (2021.01); *H01M 10/0525* (2013.01); *H01M 50/204* (2021.01);
(Continued)

(58) Field of Classification Search
CPC .. H01M 50/30; H01M 50/308; H01M 50/325; H01M 50/333; H01M 50/342;
(Continued)

(56) References Cited

U.S. PATENT DOCUMENTS

| | | | |
|---|---|---|---|
| 2010/0136391 A1 | 6/2010 | Prilutsky et al. | |
| 2012/0114993 A1* | 5/2012 | Park | H01M 50/271 429/88 |

(Continued)

FOREIGN PATENT DOCUMENTS

| | | |
|---|---|---|
| CN | 106960977 A | 7/2017 |
| CN | 109037520 A | 12/2018 |

(Continued)

OTHER PUBLICATIONS

CN-212085091-U translation (Year: 2020).*

(Continued)

*Primary Examiner* — Helen Oi K Conley
*Assistant Examiner* — Amanda Rosenbaum
(74) *Attorney, Agent, or Firm* — Scully, Scott, Murphy & Presser, P.C.

(57) ABSTRACT

A battery, a power consumption device, and a method and device for producing a battery are disclosed. The battery includes: a first battery cell and a second battery cell adjacent to each other, the first battery cell including a pressure relief mechanism disposed on a first wall of the first battery cell; a fire-fighting pipeline configured to discharge a fire-fighting medium toward the first wall when the pressure relief mechanism is actuated; and a blocking component protruding from the first wall along a direction perpendicular to the first wall, and the blocking component being configured to block the fire-fighting medium discharged (Continued)

from the fire-fighting pipeline from flowing from the first battery cell to the second battery cell to improve the safety performance of the battery.

13 Claims, 9 Drawing Sheets

(51) Int. Cl.
| | | |
|---|---|---|
| *H01M 50/204* | (2021.01) | |
| *H01M 50/249* | (2021.01) | |
| *H01M 50/375* | (2021.01) | |
| *H01M 50/383* | (2021.01) | |
| *H01M 50/507* | (2021.01) | |
| *H01M 50/547* | (2021.01) | |
| *H01M 10/65* | (2014.01) | |
| *H01M 10/6557* | (2014.01) | |
| *H01M 10/656* | (2014.01) | |
| *H01M 10/6567* | (2014.01) | |
| *H01M 50/59* | (2021.01) | |

(52) U.S. Cl.
CPC ....... *H01M 50/249* (2021.01); *H01M 50/375* (2021.01); *H01M 50/383* (2021.01); *H01M 50/507* (2021.01); *H01M 50/547* (2021.01); *H01M 10/65* (2015.04); *H01M 10/6557* (2015.04); *H01M 10/656* (2015.04); *H01M 10/6567* (2015.04); *H01M 50/59* (2021.01); *H01M 2200/10* (2013.01); *H01M 2200/20* (2013.01); *H01M 2220/20* (2013.01)

(58) Field of Classification Search
CPC ............. H01M 50/3425; H01M 50/35; H01M 50/358; H01M 50/367; H01M 50/375; H01M 50/394; H01M 10/6561; H01M 10/6566; H01M 10/655; H01M 10/60
See application file for complete search history.

(56) References Cited

U.S. PATENT DOCUMENTS

| | | | |
|---|---|---|---|
| 2013/0252063 A1* | 9/2013 | Park | H01M 50/209 |
| | | | 429/120 |
| 2016/0268643 A1* | 9/2016 | Mack | H01M 50/209 |
| 2018/0048037 A1* | 2/2018 | Newman | H01M 10/6561 |
| 2021/0013471 A1* | 1/2021 | Honda | H01M 10/052 |
| 2021/0028412 A1* | 1/2021 | Voigt | H01M 50/258 |
| 2021/0113871 A1 | 4/2021 | Huang et al. | |
| 2022/0416346 A1* | 12/2022 | He | H01M 50/264 |

FOREIGN PATENT DOCUMENTS

| | | | | |
|---|---|---|---|---|
| CN | 110165110 A | | 8/2019 | |
| CN | 209401710 U | | 9/2019 | |
| CN | 209804855 U | | 12/2019 | |
| CN | 111509163 A | * | 8/2020 | ............... A62C 3/16 |
| CN | 211376746 U | | 8/2020 | |
| CN | 111613746 A | * | 9/2020 | ............... A62C 3/07 |
| CN | 212085091 U | * | 12/2020 | |
| EP | 2569811 B1 | * | 7/2014 | ............ H01M 10/04 |
| EP | 3333932 B1 | * | 2/2019 | ............... A62C 3/16 |
| JP | 2010097836 A | | 4/2010 | |
| JP | 2016073328 A | | 5/2016 | |
| JP | 2017147128 A | | 8/2017 | |
| JP | 2019029245 A | | 2/2019 | |
| WO | 2020042410 A1 | | 3/2020 | |
| WO | 2020133677 A1 | | 7/2020 | |
| WO | 2020207329 A1 | | 10/2020 | |

OTHER PUBLICATIONS

CN-111613746-A translation (Year: 2020).*
CN111509163A) translation (Year: 2020).*
EP2569811B1 translation (Year: 2014).*
First Office Action dated Sep. 2, 2022 received in Chinese Patent Application No. CN 202110136377.X.
Second Office Action dated Feb. 19, 2023 received in Chinese Patent Application No. CN 202110136377.X.
Notice of Reasons for Refusal dated Dec. 11, 2023 received in Japanese Patent Application No. JP 2022-567165.

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2020/121995, filed on Oct. 19, 2020, the disclosure of which is hereby incorporated by reference in its entirety.

TECHNICAL FIELD

The present application relates to the field of energy storage devices, and in particular to a battery, a power consumption device, and a method and device for producing a battery.

BACKGROUND

Energy saving and emission reduction are the key to the sustainable development of the automotive industry. In this case, electric vehicles have become an important part of the sustainable development of the automotive industry due to their advantages of energy saving and environmental-friendliness. For the electric vehicles, the battery technology is an important factor for their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

The present application provides a battery, a power consumption device, and a method and device for producing a battery, which could improve the safety performance of the battery.

In a first aspect, a battery is provided, and the battery includes: a plurality of battery cells including a first battery cell and a second battery cell adjacent to each other, the first battery cell including a pressure relief mechanism, the pressure relief mechanism being disposed on a first wall of the first battery cell, and the pressure relief mechanism being configured to be actuated when an internal pressure or temperature of the first battery cell reaches a threshold, to relieve the internal pressure; a fire-fighting pipeline configured to accommodate a fire-fighting medium and discharge the fire-fighting medium toward the first wall when the pressure relief mechanism is actuated; and a blocking component protruding from the first wall along a first direction, the first direction being a direction perpendicular to the first wall, and the blocking component being configured to block the fire-fighting medium discharged from the fire-fighting pipeline from flowing from the first battery cell to the second battery cell.

The battery of an embodiment of the present application may include a plurality of battery cells, where at least some of the battery cells are provided with a pressure relief mechanism, so as to be actuated when an internal pressure or temperature of the battery cell reaches a threshold, to relieve the internal pressure. Meanwhile, a fire-fighting pipeline configured to accommodate a fire-fighting medium may be disposed outside the battery cell at a position corresponding to the pressure relief mechanism, so that the pressure relief mechanism is damaged when it is actuated, the fire-fighting pipeline may discharge the fire-fighting medium to the battery cell from a damaged region via the pressure relief mechanism, so as to achieve cooling and temperature reduction in time. In addition, for any two adjacent battery cells, a blocking component may be provided, and the locking component is protruded relative to an outer surface of a wall where the pressure relief mechanism of the two adjacent battery cells is located, which may effectively prevent the fire-fighting medium flowing out of the fire-fighting pipeline from flowing from the battery cell where thermal runaway occurs, to the adjacent battery cells, thereby reducing the possibility of occurring short circuit among the plurality of battery cells and improving the safety performance of the battery.

In some embodiments, a part of the blocking component is clamped between a second wall of the first battery cell and a second wall of the second battery cell, and both the second wall of the first battery cell and the second wall of the second battery cell are perpendicular to the first wall.

For example, the blocking component may include a first portion and a second portion, the first portion is a portion of the blocking component protruding from the first wall along the first direction, and the second portion is a portion of the blocking component clamped between the second wall of the first battery cell and the second wall of the second battery cell.

Compared with directly fixing the blocking component on the surface of the first wall, a part of the blocking component is clamped and installed between the two adjacent battery cells, which has a simpler installation process and better fixing effect.

In some embodiments, the blocking component along two ends of the first direction respectively are beyond corresponding ends of an electrode assembly of the first battery cell, and/or the blocking component along two ends of the first direction respectively are beyond corresponding ends of an electrode assembly of the second battery cell.

In other words, the second portion may be disposed between two opposite walls of the two battery cells, which has the effect of heat insulation and reduces the influence of the battery cell where thermal runaway occurs, on the adjacent battery cells.

In some embodiments, a part of the blocking component is attached to the second wall of the first battery cell and/or the second wall of the second battery cell by a connector.

For example, the connector may be a structural adhesive.

In some embodiments, the battery further includes an isolation component clamped between the second wall of the first battery cell and the second wall of the second battery cell, the isolation component being located at one side of the blocking component along the first direction and abutting against an end portion of the blocking component.

In some embodiments, the isolation component along two ends of the first direction respectively are beyond corresponding ends of an electrode assembly of the first battery cell, and/or the isolation component along two ends of the first direction respectively are beyond corresponding ends of an electrode assembly of the second battery cell.

The isolation component may effectively block heat between the two adjacent battery cells, and reduce the influence of the battery cell where thermal runaway occurs, on the adjacent battery cells.

In some embodiments, a melting point of the blocking component is higher than a melting point of the isolation component.

In some embodiments, the melting point of the blocking component is greater than or equal to 500° C.

Since a temperature of emissions of the pressure relief mechanism is high, a material with a higher melting point shall be selected for the blocking component to prevent the blocking component from melting.

In some embodiments, hardness of the blocking component is greater than hardness of the isolation component.

A material that is less easily deformed shall be selected for the blocking component, so that when the pressure relief structure of the battery cell is actuated, the blocking component may prevent particles from splashing from the battery cell to the adjacent battery cells, thereby preventing the occurrence of short circuit.

In some embodiments, a first battery cell group and a second battery cell group among the plurality of battery cells are arranged side by side along a second direction, the second direction is perpendicular to the first direction, the first battery cell group includes at least two first battery cells arranged side by side along a third direction, the second battery cell group includes at least two second battery cells arranged side by side along the third direction, and the third direction is perpendicular to the first direction and the second direction.

In some embodiments, an area of a second wall of the first battery cell is smaller than an area of a surface of a third wall of the first battery cell, an area of a second wall of the second battery cell is smaller than an area of a surface of a third wall of the second battery cell, the second wall of the first battery cell and the second wall of the second battery cell are both perpendicular to the second direction, and the third wall of the first battery cell and the third wall of the second battery cell are both perpendicular to the third direction.

In some embodiments, the first battery cell group and the second battery cell group correspond to an integral blocking component.

In some embodiments, a first electrode terminal of the first battery cell is disposed on the first wall of the first battery cell and protrudes from the first wall of the first battery cell along the first direction; a second electrode terminal of the second battery cell is disposed on a first wall of the second battery cell and protrudes from the first wall of the second battery cell along the first direction; and the first electrode terminal and the second electrode terminal have opposite polarities and are disposed adjacently along the second direction.

In some embodiments, the blocking component protrudes from the first electrode terminal and/or the second electrode terminal along the first direction.

In some embodiments, the battery further includes: a first bus component configured to connect the first electrode terminal of the first battery cell, the blocking component protruding from or being aligned with the first bus component along the first direction; and/or a second bus component configured to connect the second electrode terminal of the second battery cell, the blocking component protruding from or being aligned with the second bus component along the first direction.

In a second aspect, a power consumption device is provided, including the battery according to the first aspect or any one of the embodiments of the first aspect.

In some embodiments, the power consumption device is a vehicle, a ship or a spacecraft.

In a third aspect, a method for producing a battery is provided, including providing a plurality of battery cells, the plurality of battery cells including a first battery cell and a second battery cell adjacent to each other, the first battery cell including a pressure relief mechanism, the pressure relief mechanism being disposed on a first wall of the first battery cell, the pressure relief mechanism being configured to be actuated when an internal pressure or temperature of the first battery cell reaches a threshold, to relieve the internal pressure; providing a fire-fighting pipeline, the fire-fighting pipeline being configured to accommodate a fire-fighting medium and discharge the fire-fighting medium toward the first wall when the pressure relief mechanism is actuated; and providing a blocking component, the blocking component protruding from the first wall along a first direction, the first direction being a direction perpendicular to the first wall, and the blocking component being configured to block the fire-fighting medium discharged from the fire-fighting pipeline from flowing from the first battery cell to the second battery cell.

In a fourth aspect, a device for producing a battery is provided, including a module for executing the method provided in the foregoing third aspect.

DESCRIPTION OF EMBODIMENTS

Figure 1:
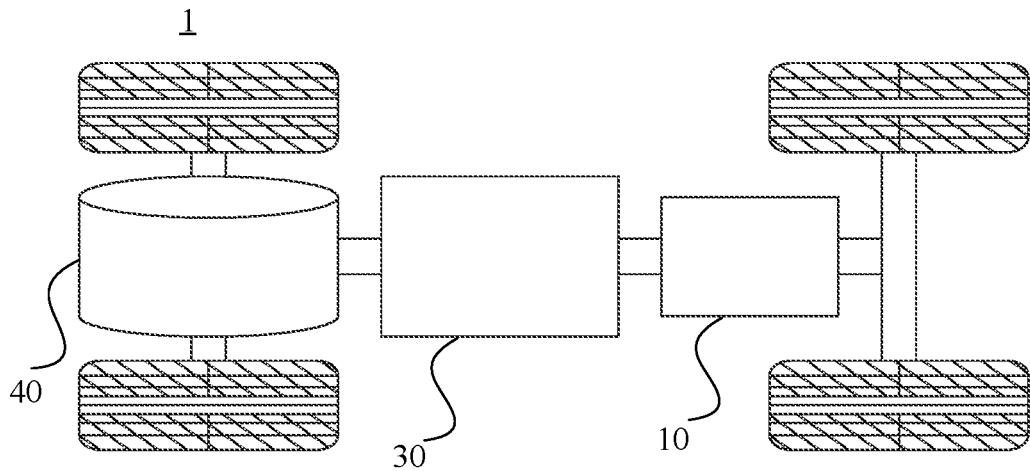
FIG. 1 is a schematic diagram of a vehicle according to an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid or in another shape, which is not limited by the embodiment of the present application. The battery cells are generally divided into three types according to the way of packaging: cylindrical battery cells, prismatic battery cells and pouch battery cells, which is not limited by the embodiment of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a case for enclosing one or more battery cells. The case can prevent a liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum, and the positive active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a winding structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated when an internal pressure or temperature of the battery cell reaches a predetermined threshold, to relieve the internal pressure or temperature. The threshold design is different according to different design requirements. The threshold may depend on the material of one or more of the positive electrode sheet, the negative electrode sheet, the electrolytic solution and the isolation film in the battery cell. The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell can be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the isolation film, high-temperature and high-pressure gases generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. The high-temperature and high-pressure emissions are discharged along a direction of the pressure relief mechanism provided in the battery cell, and more specifically, may be discharged along a direction of a region where the pressure relief mechanism is actuated. The strength and destructive power of such emissions may be great, or may even be enough to break through one or more structures along this direction, causing safety problems. In addition, after thermal runaway occurs inside the battery cell, high pressure and high heat inside the battery cell may continue to be generated, resulting in continuous potential safety hazards.

In view of the foregoing problems, a fire-fighting system may be disposed inside a case of a battery, and a fire-fighting pipeline of the fire-fighting system is disposed above a wall of a battery cell provided with a pressure relief mechanism. When the pressure relief mechanism is actuated, the fire-fighting pipeline discharges a fire-fighting medium, thereby lowering a temperature of the emissions discharged from the pressure relief mechanism and reducing the risk resulting from the emissions; and the fire-fighting medium may further flow through the actuated pressure relief mechanism to the interior of the battery cell, thereby further lowering a temperature of the battery cell and enhancing the safety of the battery. For example, the emissions discharged from the battery cell when the pressure relief mechanism is actuated may be used to damage the fire-fighting pipeline, so that the fire-fighting medium in the fire-fighting pipeline is discharged.

The fire-fighting pipeline in an embodiment of the present application is configured to accommodate a fire-fighting medium, the fire-fighting medium here may be a fluid, and the fluid may be a liquid or gas. In the case where the pressure relief mechanism does not damage the fire-fighting pipeline, the fire-fighting pipeline may not accommodate any substance, but in the case where the pressure relief mechanism is actuated, the fire-fighting medium may be accommodated in the fire-fighting pipeline, for example, the fire-fighting medium may be controlled to enter the fire-fighting pipeline by opening and closing a valve. Or, in the case where the pressure relief mechanism is not damaged, the fire-fighting medium may always be accommodated in the fire-fighting pipeline, and the fire-fighting medium may also be used for adjusting the temperature of the battery cell. Temperature adjustment means heating or cooling a plurality of battery cells. In the case of cooling or lowering the temperature of the battery cells, the fire-fighting pipeline is configured to accommodate a cooling fluid to lower the temperature of the plurality of battery cells. In this case, the fire-fighting pipeline may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas. Optionally, the fire-fighting medium can flow in a circulating manner to achieve better temperature adjustment effects. Optionally, the fire-fighting medium may be water, a mixture of water and ethylene glycol, or air, etc.

The case of the battery in an embodiment of the present application is configured to accommodate the plurality of battery cells, the bus component and other components of the battery. In some embodiments, a structure configured to fix the battery cells may also be provided in the case. The shape of the case may be determined according to the plurality of battery cells accommodated therein. In some embodiments, the case may be a cube with six walls.

The bus component is configured to implement the electrical connection between the plurality of battery cells, such as parallel connection, series connection or series-parallel connection, to form a higher voltage output. The bus component may implement the electrical connection between the battery cells by connecting electrode terminals of the battery cells. In some embodiments, the bus component may be fixed to the electrode terminals of the battery cells by means of welding. The electrical connection formed by the bus component may also be called "high-voltage connection".

In addition to the bus component, a sensing device for sensing a state of the battery cell may also be provided in the battery. In an embodiment of the present application, the electrical connection in the battery may include electrical connection formed by the bus component and/or electrical connection in the sensing device.

A pressure balancing mechanism may also be disposed on the case of the battery and configured to balance the pressure inside and outside the case. For example, when the pressure inside the case is higher than that outside the case, the gas inside the case may flow to the outside of the case through the pressure balancing mechanism; and when the pressure inside the case is lower than that outside the case, the gas outside the case may flow to the inside of the case through the pressure balancing mechanism.

It should be understood that each component in the case of the battery described above should not be construed as a limitation of the embodiment of the present application, that is, the case of the battery according to the embodiment of the present application may or may not include the foregoing components.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing devices, but also applicable to all devices using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
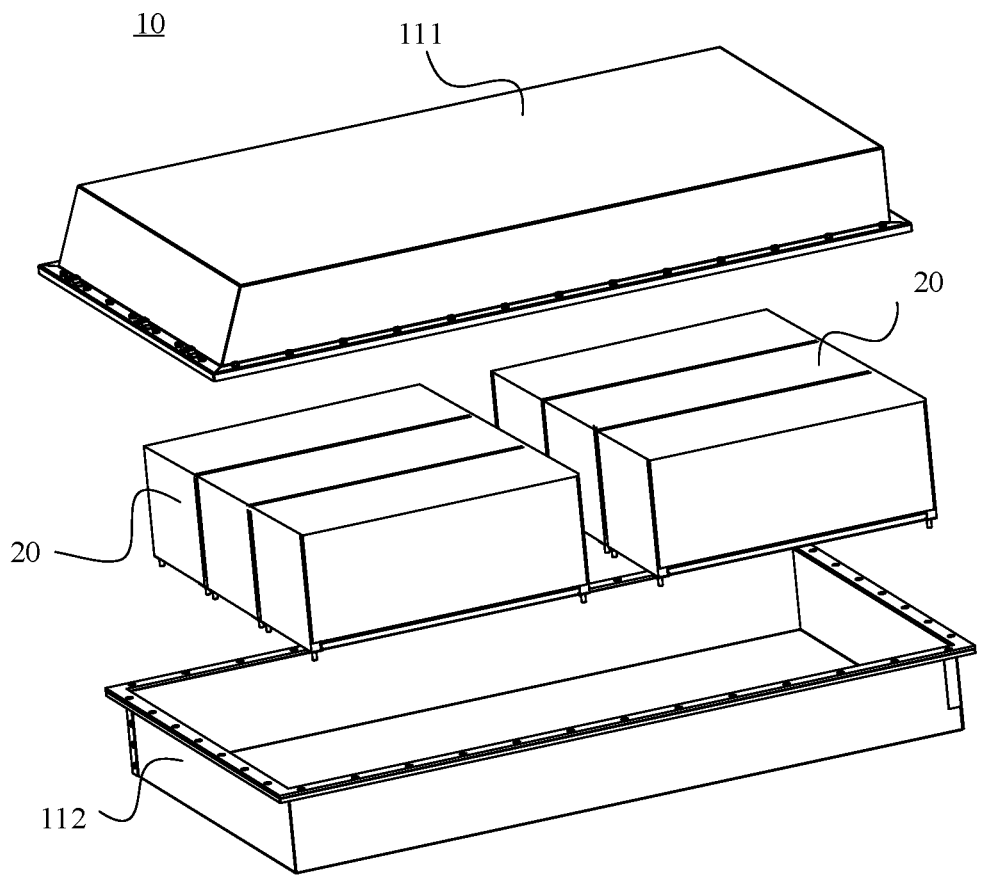
FIG. 2 is a schematic structural diagram of a battery according to an embodiment of the present application.

For example, as shown in FIG. 2, which is a schematic structural diagram of a battery 10 according to an embodiment of the present application, the battery 10 may include a plurality of battery cells 20. The battery 10 may further include a case with the interior thereof being a hollow structure, and the plurality of battery cells 20 are accommodated in the case. As shown in FIG. 2, the case may include two portions, which are respectively referred to as a first case 111 (an upper case) and a second case 112 (a lower case), and the first case 111 and the second case 112 are fastened together. The shapes of the first case 111 and the second case 112 may be determined according to the shape of the combined plurality of battery cells 20, and the first case 111 and the second case 112 may each have an opening. For example, the first case 111 and the second case 112 each may be a hollow cuboid and each have only one surface with an opening, and the opening of the first case 111 is arranged opposite to the opening of the second case 112. The first case 111 and the second case 112 are fastened to each other to form a case with a closed chamber. The plurality of battery cells 20 are combined in parallel connection or series connection or series-parallel connection and are then placed in the case formed by fastening the first case 111 to the second case 112.

Optionally, the battery 10 may also include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

Figure 3:
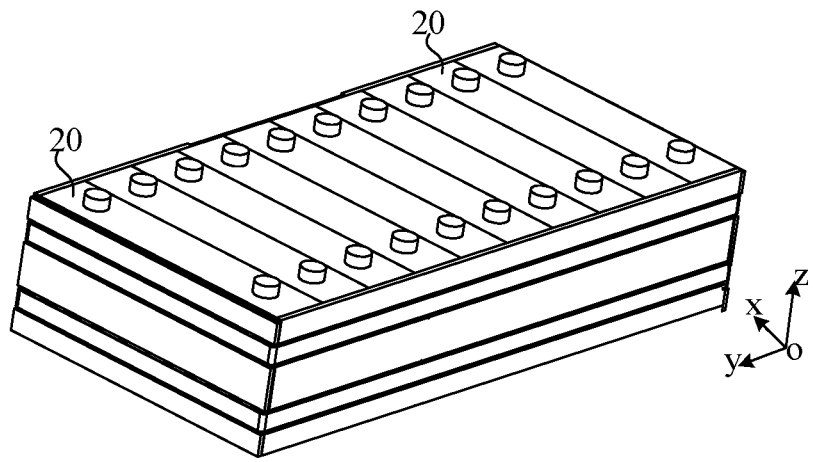
FIG. 3 is a structural schematic diagram of a battery module according to an embodiment of the present application.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel.

Figure 4:
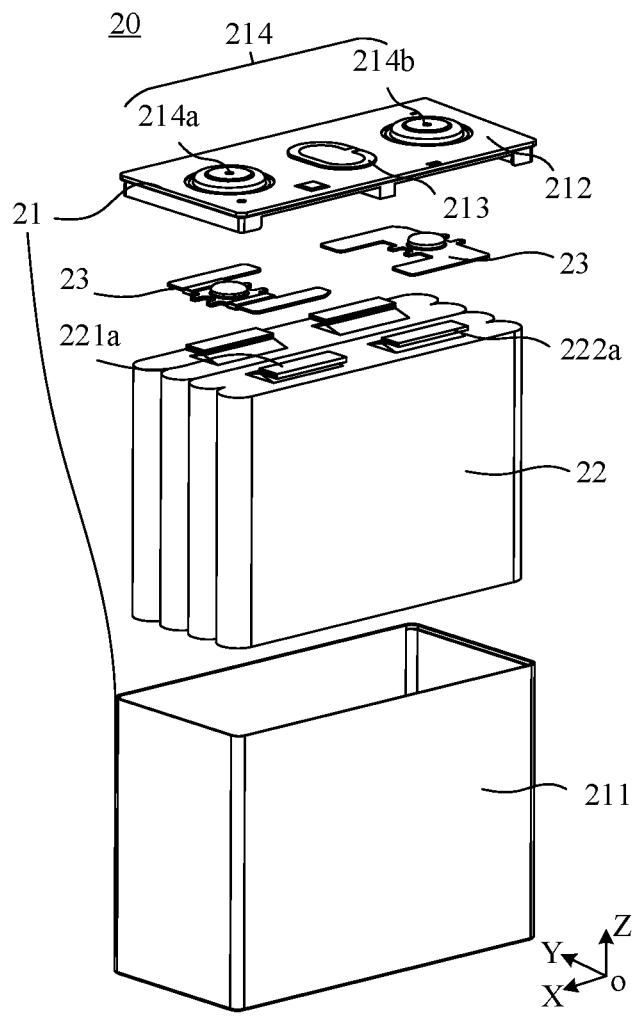
FIG. 4 is an exploded view of a battery cell according to an embodiment of the present application.

The following is a detailed description of any battery cell. FIG. 4 is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

Optionally, the battery cell 20 in the embodiment of the present application may further include a protective film disposed on an outer surface of the housing 211, for example, the protective film may be a blue film, which may be configured to wrap the housing 211 and mainly play the role of insulation. A material of the blue film may be selected from at least one of polyethylene terephthalate (Polyethylene terephthalate, PET), polyethylene (polyethylene, PE) or polypropylene (polypropylene, PP), but the embodiment of the present application is not limited thereto.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, and the second electrode tab 222a of one or more electrode assemblies 22 is connected to the other electrode terminal via the other connecting member 23. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

A pressure relief mechanism 213 may also be provided on the battery cell 20. The pressure relief mechanism is configured to be actuated when an internal pressure or temperature of the battery cell 20 reaches a threshold, to relieve the internal pressure or temperature.

The pressure relief mechanism 213 may have various possible pressure relief structures, which is not limited by the embodiment of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Considering that high-temperature emissions are discharged when the pressure relief mechanism is actuated, in order to reduce the damage of the emissions to other structures, a fire-fighting system may be disposed above a wall of the battery cell provided with the pressure relief mechanism. The emissions discharged from the battery cell when the pressure relief mechanism is actuated are used to pass through and damage the fire-fighting pipeline in the fire-fighting system, so that the fire-fighting medium in the fire-fighting pipeline cools and lowers the temperature of the emissions discharged from the pressure relief mechanism, thereby reducing the risk resulting from the emissions and enhancing the safety of the battery.

For the battery cell where thermal runaway occurs, when the pressure relief mechanism thereof is actuated, since the discharged emissions eject to the fire-fighting pipeline in a flared shape, it likely leads to the damage of a large area of fire-fighting pipeline, and then a large amount of fire-fighting medium flows out, that is, the fire-fighting medium not only flows to the battery cell where thermal runaway occurs, but also to other battery cells adjacent to the battery cell where thermal runaway occurs. However, the fire-fighting medium is usually conductive, which leads to insulation failure between the battery cell where thermal runaway occurs and an adjacent battery cell, thus causing a short circuit, especially when the voltage difference between two battery cells is large, it may cause an electric spark phenomenon. Further, when thermal runaway occurs in the battery cell, the blue film of the adjacent battery cell will melt, which also causes insulation failure between the battery cell where thermal runaway occurs and the adjacent battery cell. Therefore, the embodiment of the present application provides a battery, which could solve the problems mentioned above.

Figure 5:
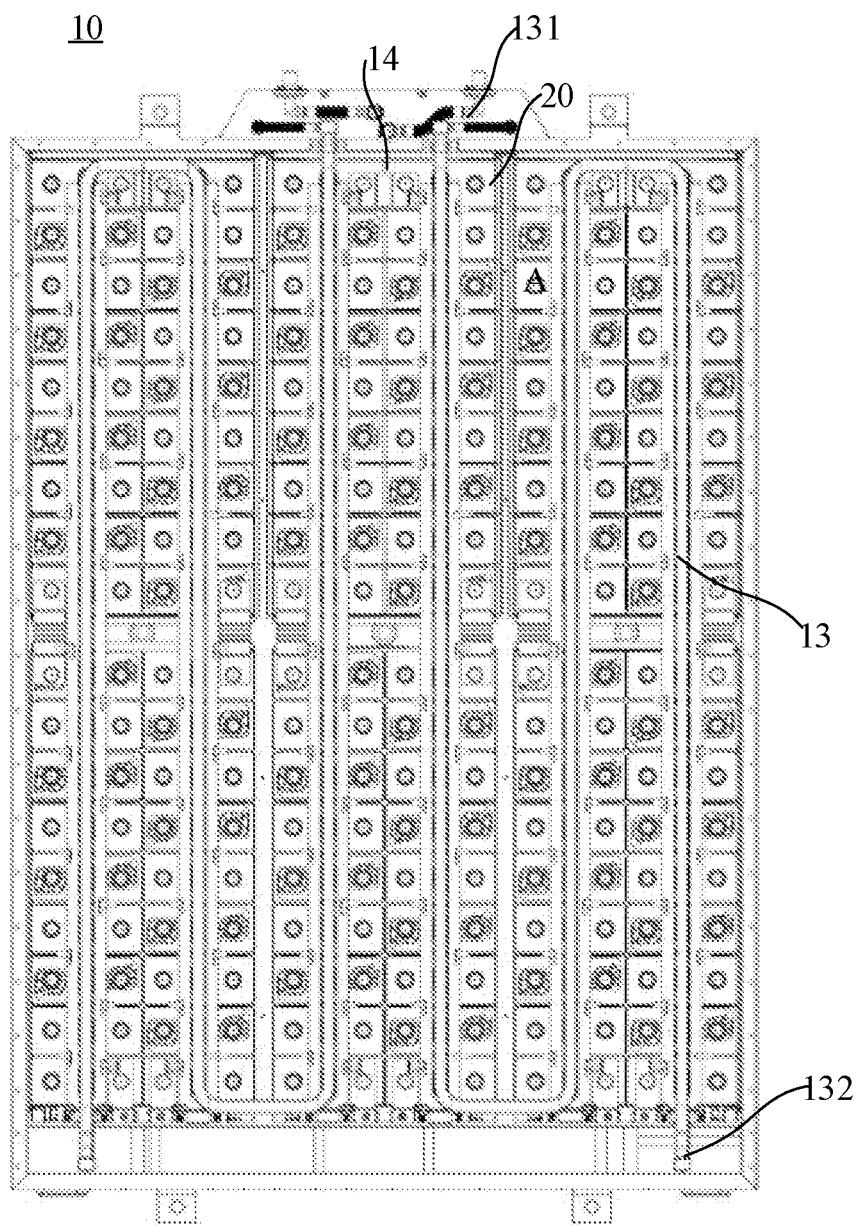
FIG. 5 is another schematic structural diagram of a battery according to an embodiment of the present application.
Figure 6:
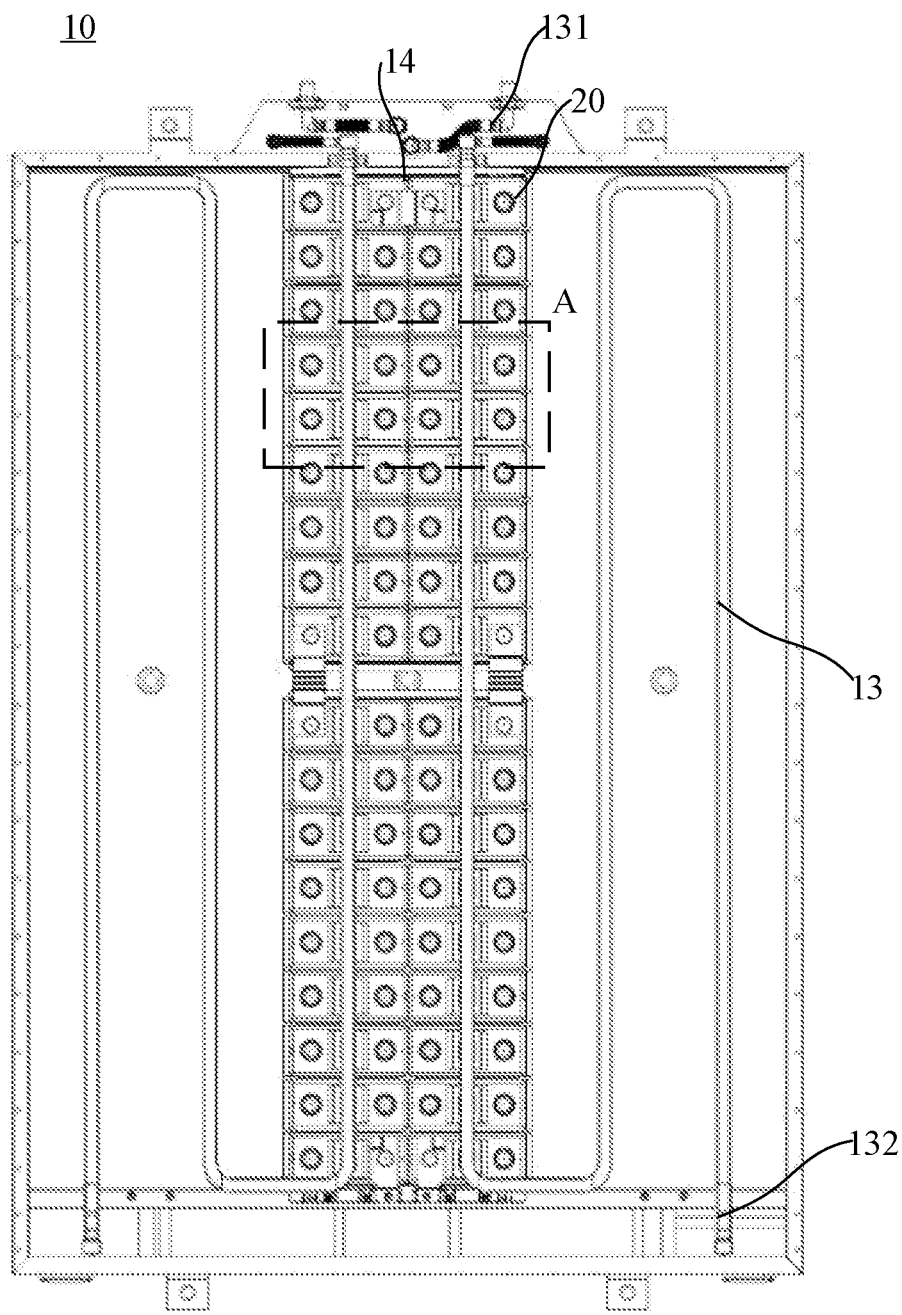
FIG. 6 is yet another schematic structural diagram of a battery according to an embodiment of the present application.
Figure 7:
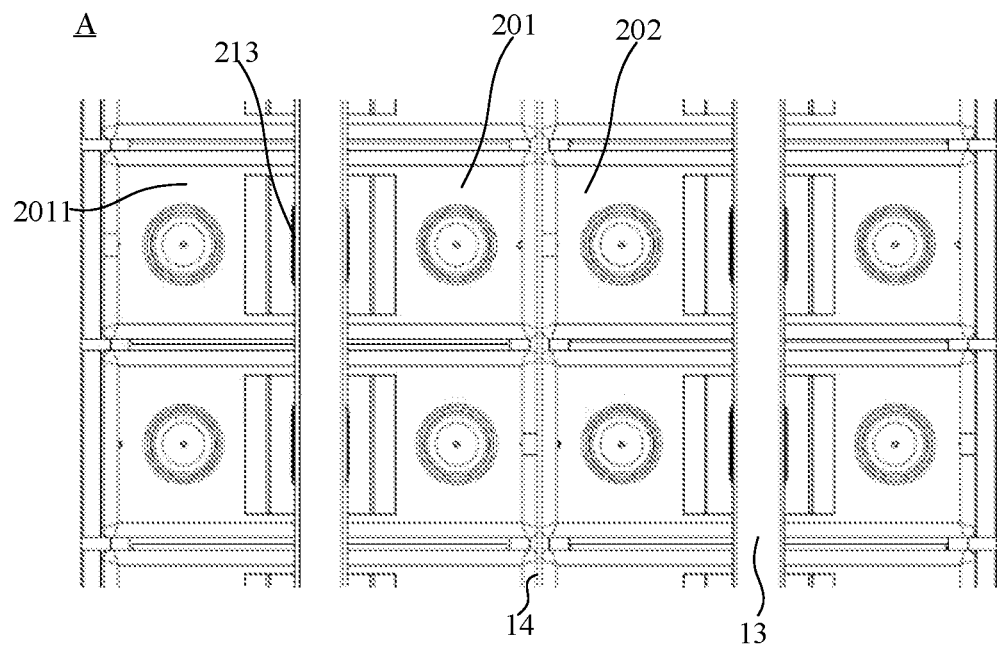
FIG. 7 is a partial enlarged view of a battery according to an embodiment of the present application.
Figure 8:
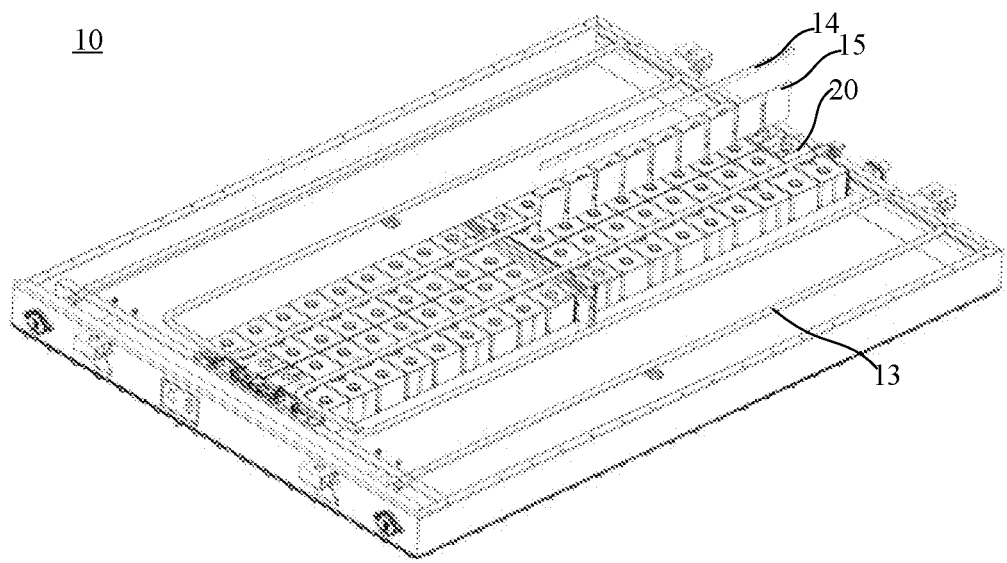
FIG. 8 is an exploded view of a battery according to an embodiment of the present application.

Specifically, FIG. 5 shows another schematic diagram of a battery 10 according to an embodiment of the present application, FIG. 6 is a schematic diagram of the battery 10 shown in FIG. 5 when only part of the battery cell is displayed, FIG. 7 is a partial enlarged view of a region A in FIG. 6, and FIG. 8 is a partial exploded view of FIG. 6. As shown in FIGS. 5-8, the battery 10 includes a plurality of battery cells 20, any two adjacent battery cells among the plurality of battery cells 20 are referred to as a first battery cell 201 and a second battery cell 202, and the first battery cell 201 includes a pressure relief mechanism 213, the pressure relief mechanism 213 may be disposed on any one wall of the first battery cell 201, and a wall where the pressure relief mechanism 213 is located is referred to as a first wall 2011; that is, the pressure relief mechanism is disposed on the first wall 2011 of the first battery cell 201, as shown in FIGS. 5-8, for example, in an embodiment of the present application, the case where the first wall 2011 is a cover plate of the battery cell 20 is taken as an example for description. The pressure relief mechanism 213 is configured to be actuated when an internal pressure or temperature of the first battery cell 201 reaches a threshold, to relieve the internal pressure.

It should be understood that the battery 10 shown in FIGS. 5-8 may correspond to the battery 10 shown in FIG. 2 and be applicable to the related description of the battery 10 shown in FIG. 2, for example, the battery 10 shown in FIGS. 5-8 may also include a case and other components. The battery cell 20 included in the battery 10 shown in FIGS. 5-8 may correspond to the battery cell 20 shown in FIGS. 3 and 4, and may be applicable to the related descriptions of the battery cell 20 shown in FIGS. 3 and 4, for example, the pressure relief mechanism 213 included in the battery cell 20 shown in FIGS. 5-8 may correspond to the pressure relief mechanism 213 shown in FIG. 4, which will not be repeated here for brevity.

In addition, as shown in FIGS. 5-8, the battery 10 may further include a fire-fighting pipeline 13 configured to accommodate a fire-fighting medium and discharge the fire-fighting medium toward the first wall 2011 of the first battery cell 201 when the pressure relief mechanism 213 is actuated; and a blocking component 14 protruding from the first wall 2011 along a first direction, i.e., protruding from an outer surface of the first wall 2011 away from the interior of the battery cell 20, where the first direction is a direction perpendicular to the first wall 2011, and the blocking component is configured to block the fire-fighting medium discharged from the fire-fighting pipeline 13 from flowing from the first battery cell 201 to the second battery cell 202.

Therefore, the battery 10 of an embodiment of the present application may include a plurality of battery cells 20, there is at least one battery cell 20 among the plurality of battery cells 20 that is provided with a pressure relief mechanism 213 so as to be actuated when an internal pressure or temperature of the battery cell reaches a threshold, to relieve the internal pressure. Meanwhile, a fire-fighting pipeline 13 configured to accommodate a fire-fighting medium may be disposed outside the battery cell 20 at a position corresponding to the pressure relief mechanism 213, so that the pressure relief mechanism 213 is damaged when it is actuated, the fire-fighting pipeline 13 may discharge the fire-fighting medium to the battery cell 20 from a damaged region via the pressure relief mechanism 213, so as to achieve cooling and temperature reduction in time. In addition, for any two adjacent battery cells 20, a blocking component 14 may be provided, and the locking component 14 is protruded relative to an outer surface of a wall where the pressure relief mechanism 213 of the two adjacent battery cells 20 is located, which may effectively prevent the fire-fighting medium from flowing from the battery cell 20 where thermal runaway occurs, to the adjacent battery cells, thereby reducing the possibility of occurring short circuit among the plurality of battery cells 20 and improving the safety performance of the battery.

Optionally, the fire-fighting pipeline 13 in the embodiment of the present application may be set to be any shape according to practical applications. For example, a cross-sectional shape of the fire-fighting pipeline 13 may be set to be any shape according to practical applications. Considering space utilization and convenience for installation, the fire-fighting pipeline 13 may be set as a flat pipeline as shown in FIG. 5 and FIG. 6, or may be set to be other shapes, such as a cylindrical pipeline, but the embodiment of the present application is not limited thereto.

In addition, since each battery 10 in the embodiment of the present application may include two or more battery cells 20, when the battery 10 includes a large number of battery cells 20, a plurality of battery cells 20 may be arranged in an array. For example, the battery 10 in FIG. 5 may include 6*18 battery cells 20 arranged in an array, and FIGS. 6 and 8 only show some of the battery cells 20 located in the middle of the battery 10, and do not show a plurality of battery cells 20 on both sides. These battery cells 20 shown in FIGS. 6 and 8 may be regarded as a 2*18 array.

Correspondingly, the appearance of the fire-fighting pipeline 13 provided above the battery cell 20 may be set as a corresponding shape. For example, for any one row of battery cells 20 included in the battery 10, the fire-fighting pipeline 13 may be set as a straight communication pipeline provided above the battery cell 20, which is controlled by a group of valves. For any two adjacent rows of battery cells 20, in order to save space and facilitate control, the fire-fighting pipeline 13 may be set as a U-shaped communication pipeline with one bend, which is controlled by a group of valves. Similarly, for adjacent three rows of battery cells 20 included in the battery 10, the fire-fighting pipeline 13 may also be set as an S-shaped communication pipeline with two bends as shown in FIG. 5, FIG. 6 and FIG. 8 (FIG. 5 and FIG. 6 respectively include two S-shaped fire-fighting pipelines), which is controlled by a group of valves. By analogy, for any more than three rows of adjacent battery cells 20 included in the battery 10, the fire-fighting pipeline 13 may be set as a curved communication pipeline with more bends, which may be controlled by a group of valves, or may be set as a plurality of communication pipelines respectively controlled by a plurality of groups of valves. For example, the plurality of communication pipelines may include at least one of a straight pipeline, a U-shaped pipeline or an S-shaped pipeline, and as shown in FIG. 5 and FIG. 6, the battery cell 10 includes two S-shaped fire-fighting pipelines, which are controlled by two groups of valves respectively, but the embodiment of the present application is not limited thereto.

In an embodiment of the present application, a group of valves includes an inlet valve and/or an outlet valve, the inlet valve is configured to fill a fire-fighting medium to the fire-fighting pipeline 13, and the outlet valve is configured to discharge the fire-fighting medium outwards. For example, as shown in FIG. 5 and FIG. 6, the S-shaped fire-fighting pipeline 13 may include two valves 131 and 132, for example, the valve 131 may be an inlet valve, then the valve 132 may be an outlet valve, or the valve 131 may be an outlet valve, then the valve 132 is an inlet valve. The circulation of the fire-fighting medium in the fire-fighting pipeline 13 may be achieved by providing the inlet valve and the outlet valve at the same time, so that the fire-fighting pipeline 13 may also be used for cooling or heating when it is not damaged. In addition, the positions of the valves may be set according to practical applications. For example, in the case where the battery 10 includes multiple groups of valves, in order to facilitate installation, the multiple groups of valves may be arranged on the same side of the battery 10; or, as shown in FIG. 5 and FIG. 6, the valves may also be arranged on both sides, but in order to facilitate control, all the inlet valves may be arranged on the same side and all the outlet valves may be arranged on the other side, but the embodiment of the present application is not limited thereto.

It should be understood that, as shown in FIGS. 5-8, the blocking component 14 in the embodiment of the present application protrudes relative to the first wall 2011 of the battery cell 20, where the protruding portion of the blocking component 14 relative to the first wall 2011 may be perpendicular to or approximately perpendicular to the first wall 2011, that is, the protruding portion of the blocking component 14 relative to the first wall 2011 may be parallel to the first direction or slightly deviated from the first direction, but the embodiment of the present application is not limited thereto.

Optionally, the arrangement of the blocking component 14 in the embodiment of the present application may include the following manners: the blocking component 14 may be disposed between two battery cells 20, for example, a part of the blocking component 14 is clamped between the first battery cell 201 and the second battery cell 202; or, the blocking component 14 may also be disposed on the first wall of the first battery cell near the edge of the second battery cell, for example, the blocking component 14 may be attached to the outer surface of the first wall of the first battery cell near the edge of the second battery cell, so as to block the fire-fighting medium from flowing from the first battery cell to the second battery cell. For ease of description, the case where the blocking component 14 is disposed between the first battery cell 201 and the second battery cell 202 is taken as an example in this text, but the embodiment of the present application is not limited thereto.

Optionally, as shown in FIG. 8, the battery 10 of the embodiment of the present application may further include an isolation component 15, which may be clamped between two adjacent battery cells 20, for example, the isolation component 15 may be clamped between the first battery cell 201 and the second battery cell 202. In addition, the isolation component 15 may be located at one side of the blocking component 14 along the first direction and abut against an end portion of the blocking component 14. The isolation component may be configured to block heat of the two adjacent battery cells. In addition, as for the blocking component 14 disposed between any two adjacent rows of battery cells 20 in the embodiment of the present application, the blocking component 14 may be a plurality of separate components or an integral component as shown in FIG. 8, but the embodiment of the present application is not limited thereto. Hereinafter, a blocking component 14 and an isolation component 15 in an embodiment of the present application will be described in detail with reference to the accompanying drawings.

First, the arrangement position of the blocking component 14 in the embodiment of the present application will be described in detail.

Figure 9:
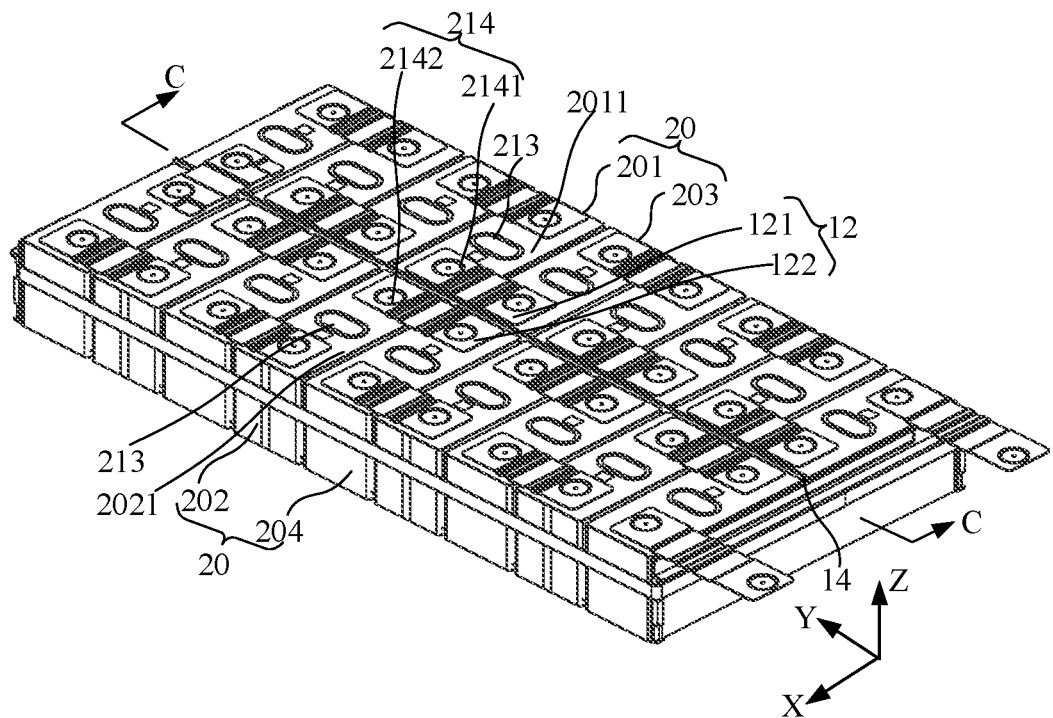
FIG. 9 is a schematic diagram of a plurality of battery cells included in a battery according to an embodiment of the present application.

FIG. 9 shows a schematic diagram of a plurality of battery cells 20 in an embodiment of the present application, where 2*9 battery cells 20 are used for illustration in FIG. 9, for example, the 2*9 battery cells 20 shown in FIG. 7 may be some of the plurality of battery cells 20 included in the battery 10 shown in FIG. 5, FIG. 6 or FIG. 8, and are applicable to relevant descriptions, which are not described here again for brevity.

As shown in FIG. 9, each battery cell 20 is approximately a cuboid, and a pressure relief mechanism 213 of each battery cell 20 is disposed on a cover plate of the battery cell 20. For ease of description, three directions are first defined here, and a direction perpendicular to a wall where the pressure relief mechanism 213 is located is a first direction, and as shown in FIG. 9, the first direction includes the Z direction and the opposite direction of the Z direction; a second direction is perpendicular to the Z direction, and as shown in FIG. 9, the second direction includes the X direction and the opposite direction of the X direction; and a third direction is perpendicular to the Z direction and the X direction, and as shown in FIG. 9, the third direction includes the Y direction and the opposite direction of the Y direction.

As shown in FIG. 9, a plurality of battery cells 20 are divided into two groups arranged along the X direction, which are referred to as a first battery cell group and a second battery cell group respectively. The first battery cell group includes at least two battery cells arranged side by side along the Y direction, and the second battery cell group also includes at least two battery cells arranged side by side along the Y direction. As shown in FIG. 9, a first battery cell in the embodiment of the present application refers to a battery cell 201 located in the first battery cell group, then a second battery cell adjacent to the first battery cell may refer to a battery cell 203 located in the first battery cell group and/or a battery cell 202 adjacent to the battery cell 201 in the second battery cell group. That is, as shown in FIG. 9, the first battery cell and the second battery cell in the embodiment of the present application may refer to any two adjacent battery cells in the first battery cell group, such as battery cells 201 and 203, or refer to any two adjacent battery cells in the second battery cell group, such as battery cells 202 and 204, or refer to the battery cells 201 and 202 respectively located in the first battery cell group and the second battery cell group, and may also refer to the battery cells 203 and 204 respectively located in the first battery cell group and the second battery cell group, but the embodiment of the present application is not limited thereto.

It should be understood that each battery cell 20 in the embodiment of the present application is provided with two electrode terminals with opposite polarities, and the arrangement directions of the electrode terminals of the plurality of battery cells 20 are generally the same. Specifically, the battery cell 201 and the battery cell 202 in FIG. 9 are taken as an example, the wall where the pressure relief mechanism 213 of the battery cell 201 is located is also provided with two electrode terminals distributed along the X direction, and the polarities of the two electrode terminals are opposite, where the electrode terminal close to the battery cell 202 is referred to as a first electrode terminal 2141; similarly, the wall where the pressure relief mechanism 213 of the battery cell 202 is located is also provided with two electrode terminals distributed along the X direction, and the polarities of the two electrode terminals are opposite, where the electrode terminal close to the battery cell 201 is referred to as a second electrode terminal 2142. It should be understood that the polarities of the first electrode terminal 2141 and the second electrode terminal 2142 may be the same or different.

Optionally, still taking FIG. 9 as an example, the electrode terminals of the plurality of battery cells 20 may be electrically connected through a bus component 12, and a bus component for electrically connecting the first electrode terminal 2141 is referred to as a first bus component 121, for example, the first bus component 121 may be configured to electrically connect the first electrode terminal 2141 of the battery cell 201 to one electrode terminal of the battery cell 203. Similarly, a bus component for electrically connecting the second electrode terminal 2142 is referred to as a second bus component 122, for example, the second bus component 122 may be configured to electrically connect the second electrode terminal 2142 of the battery cell 202 to one electrode terminal of the battery cell 204. Therefore, according to the connection manner of the bus component as shown in FIG. 9, the polarities of the first electrode terminal 2141 and the second electrode terminal 2142 are opposite, and there is a voltage difference between them, and the magnitude of the voltage difference is related to the number of battery cells 20. When the voltage difference between the battery cell 201 and the battery cell 202 is large, if thermal runaway occurs in the battery cell 201, the high-temperature particles ejected through the pressure relief mechanism 213 or the fire-fighting medium flowing out of the fire-fighting pipeline 13 may cause a short circuit between the battery cell 201 and the battery cell 202 and cause an electric spark phenomenon, when the pressure relief mechanism 213 is actuated and the fire-fighting pipeline 13 is damaged. Therefore, a blocking component 14 is required to be disposed between the battery cell 201 and the battery cell 202, so as to block the fire-fighting medium or the emissions of the pressure relief mechanism 213 from flowing from the battery cell 201 where thermal runaway occurs, to the battery cell 202, thereby improving the safety performance of the battery cell.

In addition, as an example, in the embodiment of the present application, the case where the blocking components 14 is provided between the battery cell 201 and the battery cell 202, and between the battery cell 203 and the battery cell 204 as an example for description, that is, as shown in FIG. 9, a plurality of battery cells included in the first battery cell group are referred to as the first battery cell, and the battery cell 201 is mainly used as an example for description; and a plurality of battery cells included in the second battery cell group are referred to as the second battery cell, and the battery cell 202 adjacent to the battery cell 201 is mainly used as an example for description, but the embodiment of the present application is not limited thereto. For example, the blocking component 14 may also be provided between the battery cell 201 and the battery cell 203 to block the fire-fighting medium from flowing from the battery cell 201 to the battery cell 203 or block the fire-fighting medium from flowing from the battery cell 203 to the battery cell 201; and the blocking component 14 may also be provided between the battery cell 202 and the battery cell 204 to block the fire-fighting medium from flowing from the battery cell 202 to the battery cell 204, or to block the fire-fighting medium from flowing from the battery cell 204 to the battery cell 202.

In addition, according to the arrangement shown in FIG. 9, the wall where the pressure relief mechanism 213 of the battery cell 201 is located is a first wall 2011, then a wall perpendicular to the first wall 2011 includes a second wall with a smaller area and a third wall with a larger area, and the second wall and the third wall are both side walls. Similarly, the wall where the pressure relief mechanism 213 of the battery cell 202 is located is a first wall 2021, then a wall perpendicular to the first wall 2021 of the battery cell 202 includes a second wall with a smaller area and a third wall with a larger area, and the second wall and the third wall are both side walls. In FIG. 9, the blocking component 14 is disposed between the second wall with a smaller area of the battery cell 201 and the second wall with a smaller area of the battery cell 202, but on the contrary, unlike the arrangement in FIG. 9, the blocking component 14 may also be disposed between the third wall with a larger area of the battery cell 201 and the third wall with a larger area of the battery cell 202, but the embodiment of the present application is not limited thereto.

The form of the blocking component 14 in an embodiment of the present application will be described in detail with reference to the accompanying drawings.

Figure 10:
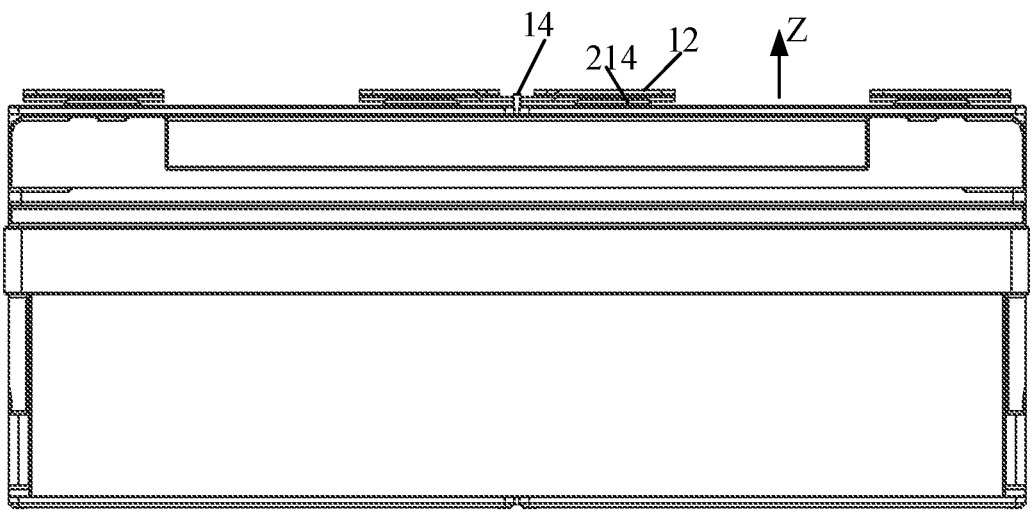
FIG. 10 is a side view of a plurality of battery cells included in a battery according to an embodiment of the present application.

FIG. 10 shows a side view of the plurality of battery cells 20 shown in FIG. 9, and the side view shows a side surface parallel to a plane where the Z direction and the X direction lie. As shown in FIG. 10, an electrode terminal 214 of a battery cell 20 protrudes from an upper surface of a first wall where a pressure relief mechanism 213 of the battery cell 20 is located along the Z direction, and a bus component 12 for electrically connecting different electrode terminals 214 covers an upper surface of the electrode terminal 214. In addition, the blocking component 14 protrudes from the electrode terminal 214 along the Z direction; furthermore, the blocking component protrudes from or is aligned with or is slightly lower than the bus component 12 along the Z direction, so as to reduce the possibility that the electrode terminals of the two battery cells on left and right side are conducted through the fire-fighting medium as shown in FIG. 10.

As shown in FIG. 10, since one part of the blocking component 14 protrudes from the upper surface of the first wall of the battery cell 20 along the Z direction and the other part thereof is clamped between two battery cells 20, and for ease of description, in the embodiment of the present application, the blocking component 14 is divided into a first portion and a second portion, where the first portion is a portion that protrudes from the upper surface of the first wall of the battery cell 20 along the Z direction, and the second portion is a portion other than the first portion, that is, the second portion is a portion clamped between the two battery cells 20.

Figure 11:
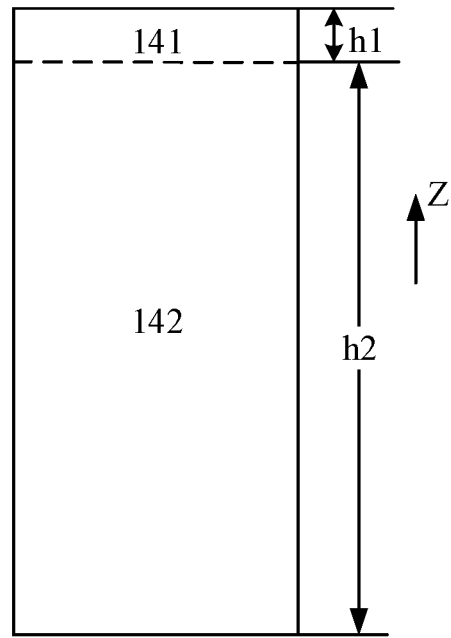
FIG. 11 is a schematic diagram of a blocking component according to an embodiment of the present application.

FIG. 11 shows a schematic diagram of a blocking component 14 according to an embodiment of the present application. For example, FIG. 11 shows the blocking component 14 between the battery cell 201 and the battery cell 202 in FIG. 9. As shown in FIG. 11, the blocking component 14 includes a first portion 141 and a second portion 142, the first portion is a portion of the blocking component 14 that protrudes from the first wall of the battery cell 201 along the Z direction, and the second portion 142 is a portion of the blocking component 14 that is clamped between the second wall of the battery cell 201 and the battery cell 202.

Optionally, as shown in FIG. 11, a height h1 of the first portion 141 is greater than or equal to a height at which the electrode terminal 214 protrudes from the first wall, and h1 is less than or equal to or greater than a height between an upper surface of the bus component 12 and an upper surface of the first wall 2011. A height h2 of the second portion 142 is greater than or equal to a height of an electrode assembly of the battery cell 20, preferably, the second portion 142 may be respectively beyond the corresponding two ends of the electrode assembly of the battery cell 20 along the Z direction and the opposite direction of Z, that is, the second portion 142 is beyond an upper end of the electrode assembly of the battery cell 20 along the Z direction, the upper end is an end close to the electrode terminal, and the second portion 142 is beyond a lower end of the electrode assembly of the battery cell 20 along the opposite direction of Z, the lower end is opposite to the upper end and is an end away from the electrode terminal. Thermal runaway occurring in the battery cell 20 generally means that a severe chemical reaction occurs inside the main body of the electrode assembly, which will produce a high temperature. By providing the second portion 142, the heat between two adjacent battery cells may be isolated.

Figure 12:
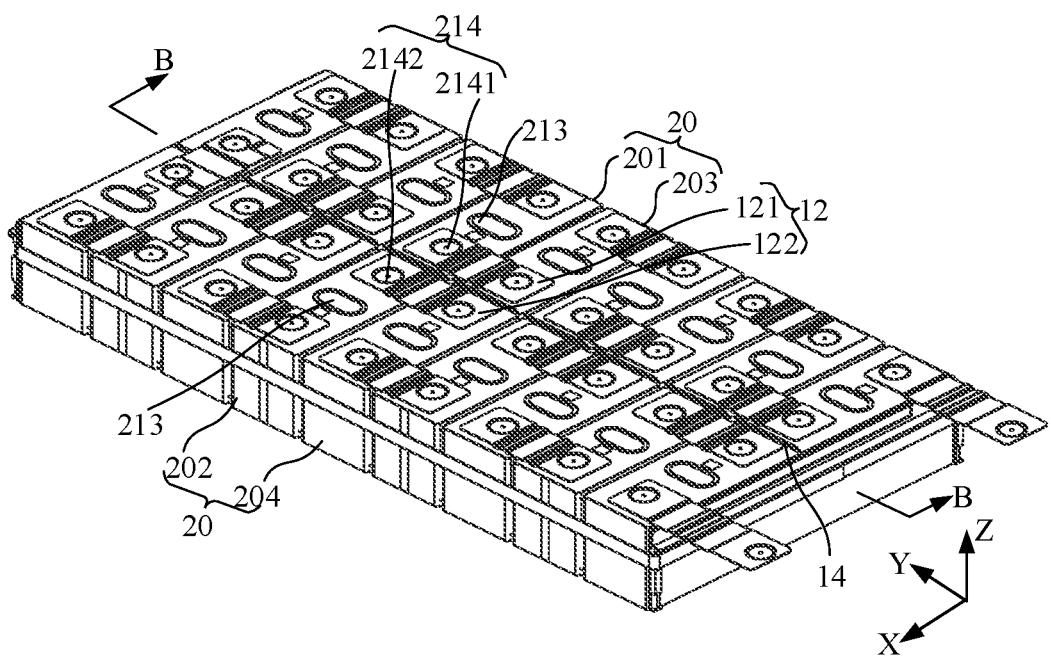
FIG. 12 is another schematic diagram of a plurality of battery cells included in a battery according to an embodiment of the present application.
Figure 13:
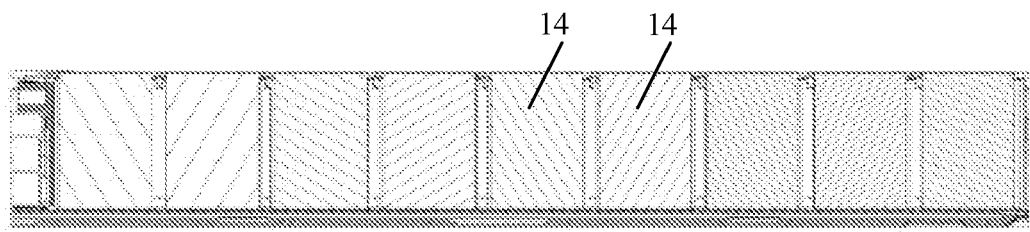
FIG. 13 is a cross-sectional view of a blocking component according to an embodiment of the present application.

As for the height of the first portion 141 and the second portion 142 shown in FIG. 11, since the second portion 142 needs to be clamped between two adjacent battery cells 20, and the form shown in FIG. 12 is usually adopted for better fixing and installation. Specifically, FIG. 12 shows another schematic diagram of a plurality of battery cells 20 according to an embodiment of the present application, and FIG. 13 shows a possible cross-sectional view of FIG. 12 along the direction B-B. By comparing FIG. 12 with FIG. 9 and combining with FIG. 13, it can be known that the blocking component 14 in FIGS. 12 and 13 is a plurality of separate components, for example, the blocking component 14 between the battery cell 201 and the battery cell 202 is separated from the blocking component 14 between the battery cell 203 and the battery cell 204, which can reduce the influence of setting the blocking component 14 on the positions of the plurality of battery cells 20, and ensure that the plurality of battery cells 20 adjacent to each other may be aligned as much as possible, which is more conducive to installation, but the embodiment of the present application is not limited thereto.

Figure 14:
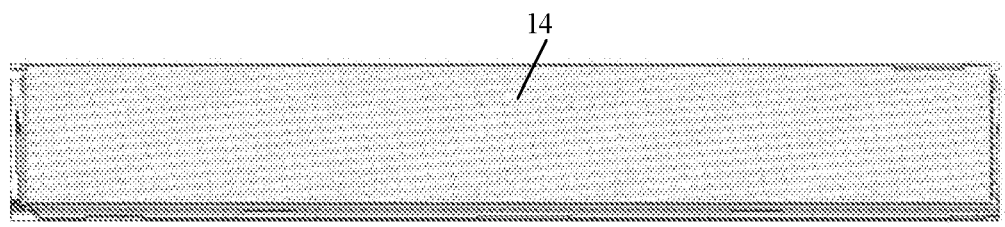
FIG. 14 is another cross-sectional view of a blocking component according to an embodiment of the present application.

For example, the blocking component 14 between the plurality of adjacent battery cells 20 may be set as an integral plate-shaped structure. FIG. 14 shows a possible cross-sectional view of FIG. 9 along the direction C-C. As shown in FIG. 14, the blocking component 14 between two adjacent rows of battery cells 20 is set as an integral plate-shaped structure.

Figure 15:
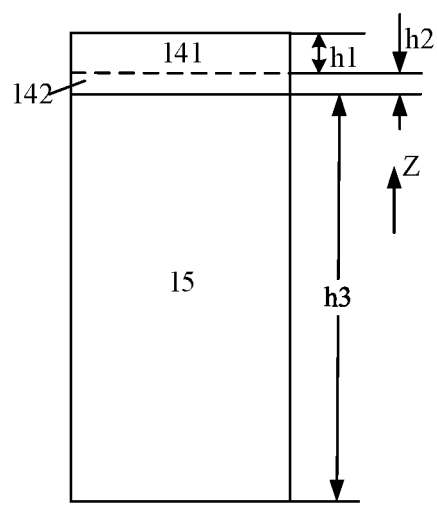
FIG. 15 is a schematic diagram of a blocking component and an isolation component according to an embodiment of the present application.

Optionally, FIG. 15 shows another schematic diagram of a blocking component 14 according to an embodiment of the present application. As shown in FIG. 15, a height h1 of a first portion 141 is consistent with that in FIG. 11, but a height h2 of a second portion 142 is lower, and the second portion 142 is configured to clamp and fix the blocking component 14 between two battery cells. In addition, an isolation component 15 may be disposed below the blocking component 14, i.e., between two battery cells 20, and the isolation component 15 is located at one side of the blocking component 14 along the first direction and abuts against an end portion of the blocking component, i.e., abuts against the second portion 142; or, the isolation component 15 may be not in contact with the second portion 142, and there is an interval along the Z direction, but the embodiment of the present application is not limited thereto. In the present application, the case where the isolation component 15 abuts against the second portion 142 as shown in FIG. 15 is taken as an example.

A height h3 of the isolation component 15 is greater than or equal to a height of an electrode assembly of the battery cell 20, preferably, the isolation component 15 may be respectively beyond the corresponding two ends of the electrode assembly of the battery cell 20 along the Z direction and the opposite direction of Z, that is, the isolation component 15 is beyond an upper end of the electrode assembly of the battery cell 20 along the Z direction, the upper end is an end close to the electrode terminal, and the isolation component 15 is beyond a lower end of the electrode assembly of the battery cell 20 along the opposite direction of Z, the lower end is opposite to the upper end and is an end away from the electrode terminal. In this way, the isolation component 15 may be similar to the second portion 142 in FIG. 11, thus playing a role in isolating heat between the two adjacent battery cells.

Optionally, as for the heights of the first portion 141 and the second portion 142 of the blocking component 14 shown in FIG. 15, the form shown in FIG. 8 is usually adopted, that is, an integral blocking component 14 is adopted to be disposed between the battery cells 20, or a separate structure may be adopted as shown in FIG. 12, that is, the blocking components 14 between two different adjacent battery cells 20 are separated from each other. Similarly, as for the isolation components 15 disposed between two battery cells 20, a plurality of separate structures may be adopted to facilitate the alignment and fixation of the plurality of battery cells 20, or an integral structure may be adopted, and two adjacent rows of battery cells 20 are provided with the same isolation component 15. In addition, the blocking component 14 with an integral structure or a separate structure may be used in combination with the isolation component 15 with a separate structure, and may also be used in combination with the isolation component 15 with an integral structure, but the embodiment of the present application is not limited thereto.

Figure 16:
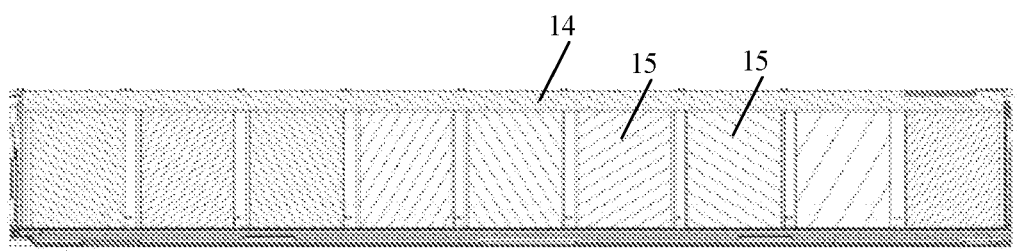
FIG. 16 is a cross-sectional view of a blocking component and an isolation component according to an embodiment of the present application.
Figure 17:
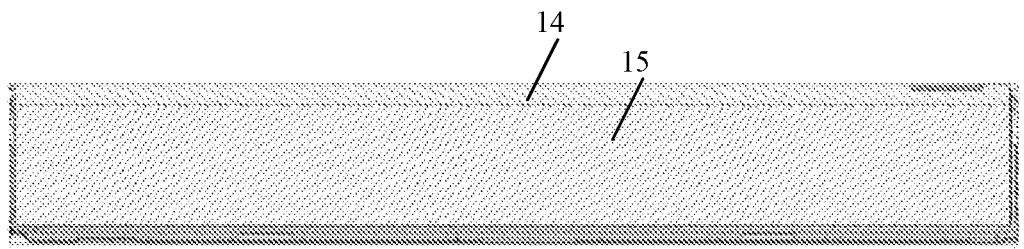
FIG. 17 is another cross-sectional view of a blocking component and an isolation component according to an embodiment of the present application.

For example, FIG. 16 shows another possible cross-sectional view of FIG. 9 along the direction C-C, that is, the blocking component 14 adopts an integral structure and the isolation component 15 adopts a separate structure; further, after the battery cells 20 and the isolation component 15 therebetween are fixedly installed, the entire blocking component 14 may be inserted therein to improve the installation efficiency. For another example, FIG. 17 shows another possible cross-sectional view of FIG. 9 along the direction C-C, that is, the blocking component 14 adopts an integral structure, and the isolation component 15 also adopts an integral structure.

It should be understood that the height of the electrode assembly mentioned above may refer to a height of the electrode assembly that does not include two electrode tabs. Correspondingly, two ends of the electrode assembly refer to two end faces of the electrode assembly perpendicular to the first direction in the case where the electrode assembly does not include two electrode tabs, and a distance between these two end faces is the height of the electrode assembly mentioned above.

It should be understood that the blocking component 14 and/or the isolation component 15 in an embodiment of the present application may be fixed between two battery cells through a connector. For example, taking the blocking component 14 between the battery cell 201 and the battery cell 202 as an example, the second portion 142 may be attached to the second wall of the battery cell 201 and/or the second wall of the battery cell 202 through a connector. For example, the connector may be a structural adhesive or the like.

Since a temperature of the discharged emissions is high when the pressure relief mechanism 213 is actuated, a material with a higher melting point is selected for the blocking component 14. Optionally, a melting point of the blocking component 14 may be higher than a melting point of the isolation component 15. For example, a material with a melting point greater than or equal to 300° C. may be selected for the blocking component 14, or a material with a melting point greater than or equal to 500° C. may be selected for the blocking component 14, but the embodiment of the present application is not limited thereto.

A material that is less easily deformed shall be selected for the blocking component 14, so that when the pressure relief structure 213 of the first battery cell is actuated, the blocking component 14 may prevent particles from splashing from the first battery cell to the second battery cell, thereby preventing the occurrence of short circuit. For example, the blocking component 14 may select a material with higher hardness, and the hardness of the blocking component 14 is greater than the hardness of the isolation component 15.

For example, the material of the blocking component 14 in the embodiment of the present application may select a mica plate, ceramic and foam; and the isolation component 15 may select at least one of the following materials: an aerogel composite material, inorganic fiber cotton, thermosetting resin foam, or inorganic foam, so as to achieve the heat insulation function, but the embodiment of the present application is not limited thereto.

Therefore, the battery 10 of an embodiment of the present application may include a plurality of battery cells 20, there is at least one battery cell 20 among the plurality of battery cells 20 that is provided with a pressure relief mechanism 213 so as to be actuated when an internal pressure or temperature of the battery cell reaches a threshold, to relieve the internal pressure. Meanwhile, a fire-fighting pipeline 13 configured to accommodate a fire-fighting medium may be disposed outside the battery cell 20 at a position corresponding to the pressure relief mechanism 213, so that the pressure relief mechanism 213 is damaged when it is actuated, the fire-fighting pipeline 13 may discharge the fire-fighting medium to the battery cell 20 from a damaged region via the pressure relief mechanism 213, so as to achieve cooling and temperature reduction in time. In addition, for any two adjacent battery cells 20, a blocking component 14 may be provided, and the locking component 14 is protruded relative to an outer surface of a wall where the pressure relief mechanism 213 of the two adjacent battery cells 20 is located, which may effectively prevent the fire-fighting medium from flowing from the battery cell 20 where thermal runaway occurs, to the adjacent battery cell, thereby reducing the possibility of occurring short circuit among the plurality of battery cells 20 and improving the safety performance of the battery.

An embodiment of the present application further provides a power consumption device, which may include the battery 10 in each of the foregoing embodiments. Optionally, the power consumption device may be a vehicle 1, a ship or a spacecraft.

The battery and the power consumption device of the embodiment of the present application are described above, and a method and a device for producing a battery of an embodiment of the present application will be described below. For the parts that are not described in detail, reference is made to the foregoing embodiments.

Figure 18:
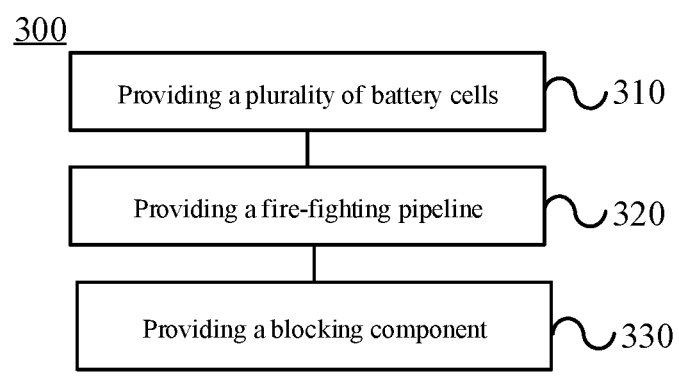
FIG. 18 is a schematic flowchart of a method for producing a battery according to an embodiment of the present application.

FIG. 18 shows a schematic flowchart of a method 300 for producing a battery according to an embodiment of the present application. As shown in FIG. 18, the method 300 may include: 310, providing a plurality of battery cells, the plurality of battery cells including a first battery cell and a second battery cell adjacent to each other, the first battery cell including a pressure relief mechanism, the pressure relief mechanism being disposed on a first wall of the first battery cell, the pressure relief mechanism being configured to be actuated when an internal pressure or temperature of the first battery cell reaches a threshold, to relieve the internal pressure; 320, providing a fire-fighting pipeline, the fire-fighting pipeline being configured to accommodate a fire-fighting medium and discharge the fire-fighting medium toward the first wall when the pressure relief mechanism is actuated; and 330, providing a blocking component, the blocking component protruding from the first wall along a first direction, the first direction being a direction perpendicular to the first wall, and the blocking component being configured to block the fire-fighting medium discharged from the fire-fighting pipeline from flowing from the first battery cell to the second battery cell.

Figure 19:
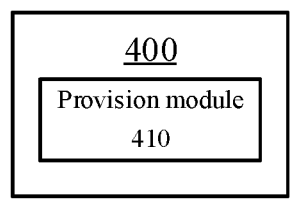
FIG. 19 is a schematic block diagram of a device for producing a battery according to an embodiment of the present application.

FIG. 19 is a schematic block diagram of a device 400 for producing a battery according to an embodiment of the present application. As shown in FIG. 19, the device 400 for producing a battery may include a provision module 410. The provision module is configured to: provide a plurality of battery cells including a first battery cell and a second battery cell adjacent to each other, the first battery cell including a pressure relief mechanism, the pressure relief mechanism being disposed on a first wall of the first battery cell, the pressure relief mechanism being configured to be actuated when an internal pressure or temperature of the first battery cell reaches a threshold, to relieve the internal pressure; provide a fire-fighting pipeline configured to accommodate a fire-fighting medium and discharge the fire-fighting medium toward the first wall when the pressure relief mechanism is actuated; and provide a blocking component protruding from the first wall along a first direction, the first direction being a direction perpendicular to the first wall, and the blocking component being configured to block the fire-fighting medium discharged from the fire-fighting pipeline from flowing from the first battery cell to the second battery cell.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions do not make the nature of the respective technical solutions depart from the spirit and scope of the technical solutions of the embodiments of the present application.

What is claimed is:
1. A battery, comprising:
a plurality of battery cells comprising a first battery cell group and a second battery cell group among the plurality of battery cells are arranged side by side along a second direction, the first battery cell group comprises at least two first battery cells arranged side by side along a third direction, the second battery cell group comprises at least two second battery cells arranged side by side along the third direction, and the third direction is perpendicular to the second direction;
the first battery cell comprising a pressure relief mechanism, the pressure relief mechanism being disposed on a first wall of the first battery cell, and the pressure relief mechanism being configured to be actuated when an internal pressure or temperature of the first battery cell reaches a threshold, to relieve the internal pressure;
a fire-fighting pipeline configured to accommodate a fire-fighting medium and discharge the fire-fighting medium toward the first wall when the pressure relief mechanism is actuated; and
a blocking component protruding from the first wall along a first direction, the first direction being a direction perpendicular to the first wall, the first direction, the second direction and the third direction are perpendicular to each other, and the blocking component being configured to block the fire-fighting medium discharged from the fire-fighting pipeline from flowing from the first battery cell to the second battery cell;
wherein a part of the blocking component is clamped between a second wall of the first battery cell and a second wall of the second battery cell, and both the second wall of the first battery cell and the second wall of the second battery cell are perpendicular to the first wall;
a plurality of isolation components being disposed between the first battery cell group and the second battery cell group, each of the plurality of isolation components clamped between the second wall of the first battery cell and the second wall of the second battery cell, the plurality of isolation components being located at one side of the blocking component along the first direction and abutting against an end portion of the blocking component, the each of the plurality of isolation components is configured to block heat transfer between the first battery cell and the second battery cell; and
wherein hardness of the blocking component is greater than hardness of the plurality of isolation components, and a melting point of the blocking component is higher than a melting point of the plurality of isolation components.

2. The battery according to claim 1, wherein the part of the blocking component is attached to the second wall of the first battery cell and/or the second wall of the second battery cell by a connector.

3. The battery according to claim 1, wherein the each of the plurality of isolation components along two ends of the first direction respectively are beyond corresponding ends of an electrode assembly of the first battery cell, and/or the each of the plurality of isolation components along two ends of the first direction respectively are beyond corresponding ends of an electrode assembly of the second battery cell.

4. The battery according to claim 1, wherein the melting point of the blocking component is greater than or equal to 500° C.

5. The battery according to claim 1, wherein an area of a second wall of the first battery cell is smaller than an area of a surface of a third wall of the first battery cell, an area of a second wall of the second battery cell is smaller than an area of a surface of a third wall of the second battery cell, the second wall of the first battery cell and the second wall of the second battery cell are both perpendicular to the second direction, and the third wall of the first battery cell and the third wall of the second battery cell are both perpendicular to the third direction.

6. The battery according to claim 1, wherein the first battery cell group and the second battery cell group correspond to an integral blocking component.

7. The battery according to claim 1, wherein a first electrode terminal of the first battery cell is disposed on the first wall of the first battery cell and protrudes from the first wall of the first battery cell along the first direction; and
a second electrode terminal of the second battery cell is disposed on a first wall of the second battery cell and protrudes from the first wall of the second battery cell along the first direction.

8. The battery according to claim 7, wherein the first electrode terminal and the second electrode terminal have opposite polarities and are disposed adjacently along the second direction.

9. The battery according to claim 7, wherein the blocking component protrudes from the first electrode terminal and/or the second electrode terminal along the first direction.

10. The battery according to claim 7, wherein the battery further comprises:
a first bus component configured to connect the first electrode terminal of the first battery cell, the blocking component protruding from or being aligned with the first bus component along the first direction.

11. The battery according to claim 10, wherein the battery further comprises:
a second bus component configured to connect the second electrode terminal of the second battery cell, the blocking component protruding from or being aligned with the second bus component along the first direction.

12. A power consumption device, comprising the battery according to claim 1.

13. A method for producing a battery, comprising:
providing a plurality of battery cells, the plurality of battery cells comprising a first battery cell group and a second battery cell group among the plurality of battery cells are arranged side by side along a second direction, the first battery cell group comprises at least two first battery cells arranged side by side along a third direction, the second battery cell group comprises at least two second battery cells arranged side by side along the third direction, and the third direction is perpendicular to the second direction;
the first battery cell comprising a pressure relief mechanism, the pressure relief mechanism being disposed on a first wall of the first battery cell, the pressure relief mechanism being configured to be actuated when an internal pressure or temperature of the first battery cell reaches a threshold, to relieve the internal pressure;
providing a fire-fighting pipeline, the fire-fighting pipeline being configured to accommodate a fire-fighting medium and discharge the fire-fighting medium toward the first wall when the pressure relief mechanism is actuated;
providing a blocking component, the blocking component protruding from the first wall along a first direction, the first direction being a direction perpendicular to the first wall, the first direction, the second direction and the third direction are perpendicular to each other, and the blocking component being configured to block the fire-fighting medium discharged from the fire-fighting pipeline from flowing from the first battery cell to the second battery cell; wherein a part of the blocking component is clamped between a second wall of the first battery cell and a second wall of the second battery cell, and both the second wall of the first battery cell and the second wall of the second battery cell are perpendicular to the first wall;
providing a plurality of isolation components, the plurality of isolation components being disposed between the first battery cell group and the second battery cell group, each of the plurality of isolation components clamped between the second wall of the first battery cell and the second wall of the second battery cell, the plurality of isolation components being located at one side of the blocking component along the first direction and abutting against an end portion of the blocking component, the each of the plurality of isolation components is configured to block heat transfer between the first battery cell and the second battery cell; and
wherein hardness of the blocking component is greater than hardness of the plurality of isolation components, and a melting point of the blocking component is higher than a melting point of the plurality of isolation components.

* * * * *